United States Patent
Lee et al.

(10) Patent No.: US 8,711,059 B2
(45) Date of Patent: Apr. 29, 2014

(54) DISPLAY APPARATUS

(75) Inventors: Kyoung Chan Lee, Seoul (KR); Chan Hwan Kim, Gyeonggi-do (KR); Gun Ho Lee, Seoul (KR)

(73) Assignee: Kortek Corporation, Incheon (KR)

( * ) Notice: Subject to any disclaimer, the term of this patent is extended or adjusted under 35 U.S.C. 154(b) by 172 days.

(21) Appl. No.: 13/503,807

(22) PCT Filed: Oct. 6, 2010

(86) PCT No.: PCT/KR2010/006810
§ 371 (c)(1),
(2), (4) Date: Apr. 24, 2012

(87) PCT Pub. No.: WO2011/052900
PCT Pub. Date: May 5, 2011

(65) Prior Publication Data
US 2012/0206320 A1   Aug. 16, 2012

(30) Foreign Application Priority Data
Oct. 27, 2009   (KR) .................. 10-2009-0102464

(51) Int. Cl.
*G09G 5/00*   (2006.01)
(52) U.S. Cl.
USPC ............................................................ 345/4
(58) Field of Classification Search
CPC ............. G09G 1/00; G09G 3/00; G09G 5/00; G09G 3/34; G09G 3/3406; G09G 3/3413; G09G 3/342; G09G 3/3426; G09G 5/14
USPC ................. 345/4, 5, 6, 7, 8, 9; 362/97.1, 97.2, 362/97.3; 349/69, 70
See application file for complete search history.

(56) References Cited

U.S. PATENT DOCUMENTS 7,034,799 B2 *   4/2006   Lee ................................ 345/102
7,695,364 B2 *   4/2010   Okada .............................. 463/20

(Continued)

FOREIGN PATENT DOCUMENTS

JP   2006-158446   6/2006
KR   10-2006-0051654 A   5/2006

(Continued)

OTHER PUBLICATIONS

International Search Report, mailed Jun. 24, 2011 in connection with PCT International Application No. PCT/KR2010/006810, filed Oct. 6, 2010.

(Continued)

*Primary Examiner* — Tom Sheng
(74) *Attorney, Agent, or Firm* — John P. White; Cooper & Dunham LLP (57) ABSTRACT

The present invention relates to a display apparatus comprising front display unit (10), and rear display unit (50) arranged behind the front display unit (10). The front display unit (10) comprise: a display panel (20); a front backlight (30) arranged behind the display panel (20) and including a first light guide plate (36) having a projection window (16) through which an image on the rear display unit (50) is visible, a first light source (38) arranged along the circumference of the first light guide plate (36), and a reflection sheet (39) arranged at the rear surface of the first light guide plate (36) to reflect light and having an image hole (18) formed at the region thereof that corresponds to the projection window (16); and a rear backlight (40) arranged behind the front backlight (30) and including a second light guide plate (42) and second light sources (44), wherein the second light guide plate (42) corresponds to the projection window (16) and is bent into a V-shape, and has a first light guide surface (42a) inclined upwardly as it extends toward the rear thereof, and a second light guide surface (42b) inclined downwardly as it extends from an end of the first light guide surface (42a) toward the rear thereof, and wherein the second light sources (44) are arranged at an upper end and a lower end of the second light guide plate (42), respectively, to illuminate the first light guide surface (42a) and the second light guide surface (42b), respectively. The rear display unit and the front display unit cooperate with one another to display a combined image. The entire screen of the front display unit is capable of displaying a clear image without any disconnection of the image.

12 Claims, 5 Drawing Sheets

(56) References Cited

U.S. PATENT DOCUMENTS

| | | | | |
|---|---|---|---|---|
| 8,353,766 | B2* | 1/2013 | Okada | 463/31 |
| 2004/0223093 | A1* | 11/2004 | Nakayoshi et al. | 349/58 |
| 2012/0206321 | A1* | 8/2012 | Lee et al. | 345/5 |
| 2012/0243207 | A1* | 9/2012 | Wang et al. | 362/97.1 |

FOREIGN PATENT DOCUMENTS

| | | |
|---|---|---|
| KR | 10-2007-0055766 A | 5/2007 |
| KR | 10-0858868 | 9/2008 |

OTHER PUBLICATIONS

Written Opinion of the International Searching Authority, mailed Jun. 24, 2011 in connection with PCT International Application No. PCT/KR2010/006810, filed Oct. 6, 2010.

International Preliminary Report on Patentability (Chapter I of the Patent Cooperation Treaty), including Written Opinion of the International Searching Authority, issued May 8, 2012 in connection with PCT International Application No. PCT/KR2010/006810, filed Oct. 6, 2010.

* cited by examiner

DISPLAY APPARATUS

Cross-Reference to Related Applications

This application is a §371 national stage of PCT International Application No. PCT/KR2010/006810, filed Oct. 6, 2010, claiming priority of Korean Patent Application No. 10-2009-0102464, filed Oct. 27, 2009, the contents of each of which are hereby incorporated by reference in their entirety.

TECHNICAL FIELD

The present invention relates to a display apparatus which includes front and rear display units cooperating with each other to display a combined image and, more particularly, to a display apparatus which permits a front display unit to display an image on an entire screen thereof without any disconnection of the screen.

BACKGROUND ART

Generally, in a slot machine using a rotational reel display unit, a liquid crystal display is used to induce interest in a game and display more colorful images. Typically, the liquid crystal display is disposed on a front side of the game machine, and an opening is formed on a light guide plate constituting a backlight unit of the liquid crystal display. Further, the opening is provided at the rear thereof with a rotational reel on which a reel band having symbol marks is mounted. With this configuration, a rear rotational reel display unit is viewed through the opening of the light guide plate and a game-related image is display through the liquid crystal display at the front side of the game machine, thereby inducing interest in the game.

However, in such a game machine, light is not emitted through the opening of the light guide plate, thereby causing disconnection of an image displayed on the liquid crystal display. For example, when a game-related image is displayed through the liquid crystal display at the front side of the game machine, with the rear rotational reel display unit stopped, it is difficult to display the image since a backlight unit is not present in a region through which the rotational reel display unit is viewed. As a result, the game machine provides only a very restrictive and disconnected screen image in displaying game results and guide messages through the front liquid crystal display.

Moreover, although the rotational reel display unit at the rear side of the game machine is illuminated by a separate lighting lamp, the rotational reel display unit is always exposed through the opening of the light guide plate even in the case where the lighting lamp is turned oft This configuration provides a coarse appearance to the display apparatus while a game is not played.

DISCLOSURE

Technical Problem

The present invention is conceived to solve such problems in the art, and provides a display apparatus configured to display a combined image through cooperation between front and rear display units, wherein the rear display unit may be viewed through a projection window and the entirety of the front display unit may be illuminated to allow the front display unit to display an image on an entire screen thereof without disconnection of the screen, so that the display apparatus may display game results, guide messages, and other game-related images on the front display unit without any restriction and may enhance screen display quality even when a game is not played.

In addition, the present invention provides a display apparatus which may selectively shield display of the front display unit in order to indicate whether a game is played or not.

Further, the present invention provides a display apparatus in which a light guide plate of a front backlight unit is formed with a pattern region and a non-pattern region to provide a projection window without cutting the light guide plate, thereby simplifying a manufacturing process of the light guide plate, improving brightness of the front backlight unit, and suppressing light interference between the front backlight unit and the rear backlight unit on the projection window.

Technical Solution

In accordance with one aspect of the present invention, a display apparatus includes a front display unit 10 and a rear display unit 50 disposed behind the front display unit 10 such that an image of the rear display unit 50 can be viewed through part of the front display unit 10, wherein the front display unit 10 includes a display panel 20; a front backlight unit 30 including a first light guide plate 36 disposed behind the display panel 20 and having a projection window 16 through which the rear display unit 50 is visible, a first light source 38 arranged along the circumference of the first light guide plate 36, and a reflective sheet 39 placed on a backside of the first light guide plate 36 to reflect light and opened at a region thereof corresponding to the projection window 16 to form an image hole 18; and a rear backlight unit 40 including a second light guide plate 42 disposed at a place corresponding to the projection window 16 behind the front backlight unit 30 and bent in a V-shape, the second light guide plate 42 including a first light guide plane 42a slanted upwards towards a rear side of the display apparatus and a second light guide plane 42b slanted downwards from a lower end of the first light guide plane 42a towards the rear side of the display apparatus, and second light sources 44 disposed at upper and lower ends of the second light guide plate 42 to illuminate the first and second light guide planes, 42a, 42b, respectively.

In some embodiments, the rear display unit 50 may be a rotational reel display unit having a plurality of variable image arrays.

In some embodiments, the rear display unit 50 may include one of an LCD, PDP, OLED, and AMOLED.

In some embodiments, the rear display unit 50 may be a picture or an object displaying an image.

In some embodiments, when the rear display unit 50 is the rotational reel display unit or the picture or object displaying an image, the display apparatus may further include a rear display lighting unit 56 which illuminates the rear display unit 50.

In some embodiments, the display panel 20 may be a liquid crystal panel, which includes a TFT substrate 26, a color filter 24, and liquid crystals encapsulated between the TFT substrate 26 and the color filter 24 bonded to each other.

In some embodiments, the projection window 16 may be formed by cutting a part of the first light guide plate 36 corresponding to the rear display unit 50.

In some embodiments, the first light guide plate 36 includes a pattern region 36a formed on a region thereof excluding the projection window 16 and having a pattern printed thereon, and a non-pattern region 36b formed on a region of the projection window 16 and having no pattern thereon.

In some embodiments, the display apparatus further includes an optical shutter 46 disposed behind the display panel 20.

In some embodiments, the optical shutter 46 may be a liquid crystal shutter including polymer dispersed liquid crystals (PDLC).

In some embodiments, the first and second light sources may be CCFLs or LEDs

Advantageous Effects

According to the present invention, the front display unit of the display apparatus is equipped with a front backlight unit having a projection window through which the rear display unit is visible, and a rear backlight unit having a light guide plate bent in a V-shape towards a rear side of the display apparatus is placed corresponding to the projection window. With this configuration, as the rear optical shutter is subjected to on/off control, the rear display unit may be viewed through the light guide plate to display a combined image in cooperation with the front display panel, or the rear display unit may be shielded to allow the front display unit to display an image on the entire screen thereof without disconnection of the screen. As a result, the display apparatus may realize display of game-related images in various ways in higher quality by allowing the game-related images to be displayed through the entire screen of the front display unit while completely blocking the rear display unit when a game is not played.

In addition, according to the present invention, the display panel is provided at the rear side thereof with an optical shutter which is used to switch the optical shutter to a transparent state or to a shielded state in order to indicate whether a game is played by controlling on/off of the overall screen of the display apparatus.

Further, according to the present invention, the light guide plate of the front backlight unit is formed with a pattern region and a non-pattern region to provide a projection window without cutting the light guide plate, thereby simplifying a manufacturing process of the light guide plate, improving brightness of the front backlight unit through an increase in total reflection area within the light guide plate, and suppressing light interference between the front backlight unit and the rear backlight unit by light shielding between the pattern region and the non-pattern region.

Furthermore, such effects of the present invention may be usefully applied not only to game machines such as slot machines, but also to a technique for embodying 3-dimensional and 2-dimensional images based on combination of front and rear display units, and other image display techniques based on combination of the front and rear display units.

<Description of reference numerals of main parts of the drawings>

| 10 | front display unit | 12 | front backlight unit housing |
|---|---|---|---|
| 14 | rear backlight unit housing | 16 | projection window |
| 18 | image hole | 20 | display panel |
| 22 | polarizer film | 24 | color film |
| 26 | TFT substrate | 28 | polarizer film |
| 30 | front backlight unit | 32 | prism sheet |
| 34 | diffusive sheet | 36 | first light guide plate |
| 36a | pattern region | 36b | non-pattern region |
| 38 | first light source | 39 | reflective sheet |
| 40 | rear backlight unit | 42 | second light guide plate |
| 42a | first light guide plane | 42b | second light guide plane |
| 44 | second light source | 46 | optical shutter |
| 50 | rear display unit | 52 | rotational reel |
| 54: | reel band | 56 | rear display lighting unit |

DESCRIPTION OF PREFERRED EMBODIMENTS

Embodiments of the present invention will now be described in detail with reference to the accompanying drawings.

The present invention relates to a display apparatus which displays a combined image through cooperation between a front display unit and a rear display unit disposed behind the front display unit. Such a display apparatus may be applied in various ways, for example, game machines such as slot machines, game machines which display images through combination of front and rear displays, 3D image display apparatuses, electronic frames, and the like.

According to one embodiment, a liquid crystal display and a rotational reel display unit may be used as front and rear display units, respectively. The rotational reel display unit may be configured to provide variable display of symbol marks printed on a reel band and to allow winning of a game to be determined according to combination of the symbol marks.

In another embodiment, the rear display unit may be replaced by other types of display unit. For example, typical display apparatuses such as a liquid crystal display (LCD), plasma display panel (PDP), organic light emitting diode (OLED), active matrix organic light emitting diode (AMOLED), and the like, may be provided as the rear display unit. In a further embodiment, a picture or an object (for example, jewelry) displaying a certain image may be provided as the rear display unit.

Figure 1:
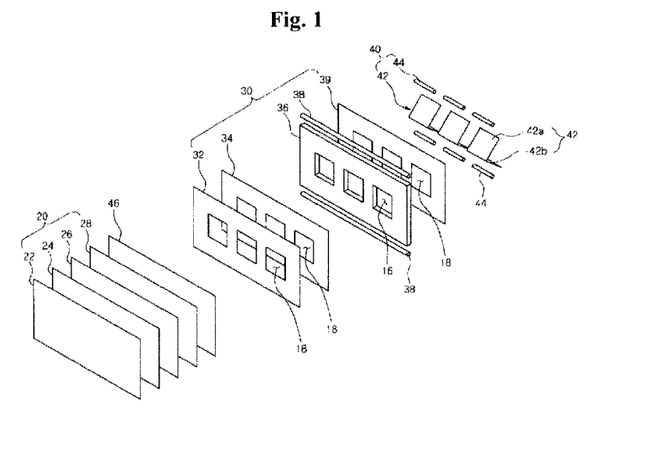
FIG. 1 is a perspective view of a front display unit in accordance with the present invention.
Figure 2:
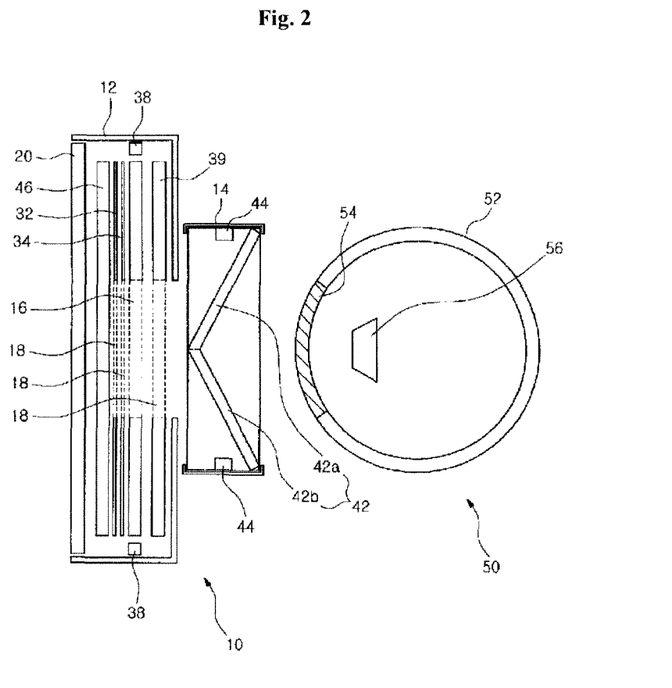
FIG. 2 is a sectional view of a display apparatus in accordance with one embodiment of the present invention.
Figure 3:
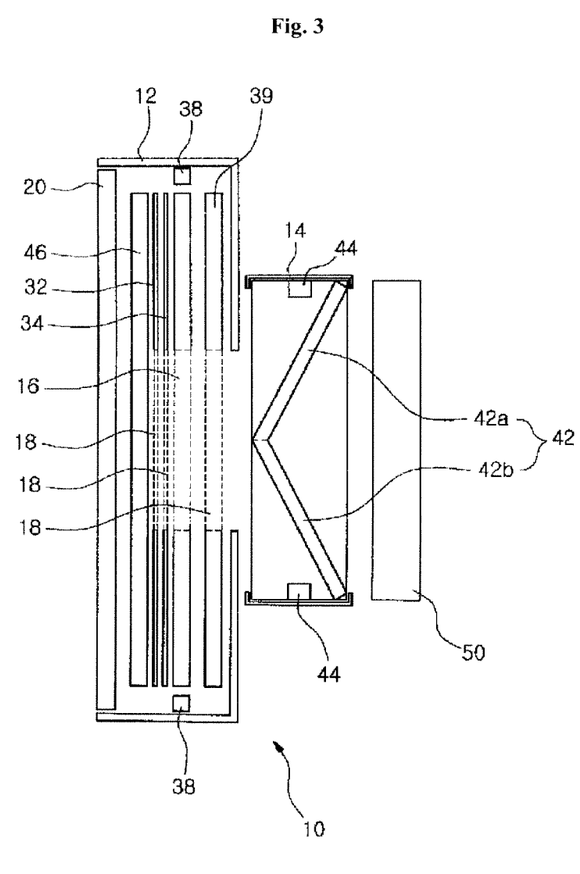
FIG. 3 is a sectional view of a display apparatus in accordance with another embodiment of the present invention.

FIG. 1 is a perspective view of one example of a front display unit in accordance with the present invention, and FIGS. 2 and 3 are schematic views of display apparatuses in accordance with embodiments of the invention. Referring to FIG. 1, the front display unit 10 includes a display panel 20, an optical shutter 46, a front backlight unit 30, and a rear backlight unit 40 arranged to form a multilayer structure. As shown in FIGS. 2 and 3, a rear display unit 50 is placed behind the front display unit 10. FIG. 2 shows a rotational reel display unit according to one embodiment of the invention and FIG. 3 shows a rotational reel display unit according to another embodiment of the invention.

Referring to FIG. 2, when a rotational reel display unit is provided as the rear display unit 50, the rotational reel display unit has a structure in which a reel band 54 is attached to an outer periphery of a rotational reel 52 and is printed with symbol marks (not shown). Further, a rear display lighting unit 56 is placed inside or outside the rotational reel 52 to illuminate the symbol marks, Accordingly, the rear display unit 50 may be viewed by operating the rear display lighting unit to illuminate the rotational reel 52, and a game result may be determined based on a combination of the symbol marks, which may be viewed through the front display unit 10 when rotation of the rotational reel 52 is stopped.

Referring to FIG. 3, the rear display unit 50 may be realized by a display unit such as an LCD, PDP, OLED, AMOLED, and the like. In this case, a game-related image is displayed through the display unit at the rear side and a gamer views the image corresponding to the game through the front display unit 10. Here, since the display unit provided as the rear display unit 50 is the same as a typical display apparatus, a detailed description of the display unit including a backlight unit will be omitted herein.

In the embodiment of FIG. 1, the display apparatus is illustrated as being applied to a slot machine, but the display apparatus according to the present invention may be embodied by a structure in which the front display unit 10 has a plurality of visible regions and 3D images can be displayed through cooperation between the front and rear display units 10, 50.

Referring to FIG. 1, the display panel 20 may be a liquid crystal panel. The display panel 20 includes a TFT substrate 26, a color filter 24, and polarizer films 22, 28 provided to front and rear sides of a panel provided by bonding the TFT substrate 26 to the color filter 24. As in a typical liquid crystal panel, the TFT substrate 26 is an array substrate which includes pixel regions and pixel electrodes arranged in a matrix, gate wires, and source wires arranged in transverse and longitudinal directions, and the color filter 24 is a glass substrate on which R, G and B patterns are printed or R, G and B films are coated. Although not shown in the drawings, a drive IC is mounted on a lateral side of the panel provided by bonding the TFT substrate 26 to the color filter 24, and liquid crystals are encapsulated between the TFT substrate 26 and the color filter 24. Each of the polarizer films 22, 28 is printed with patterns orthogonal to one another and serves to permit realization of various colors through the color filter by determining penetration and blocking of light when a polarizing direction of the light is changed according to movement of the liquid crystals. Although not shown in the drawings, the display panel 20 may further include other components, such as a protective film, a glass substrate, and the like.

The optical shutter 46 is placed between the display panel 20 and the front backlight unit 30. The optical shutter 46 allows light from the front backlight unit 30 to pass therethrough or blocks the fight therefrom, and may include polymer dispersed liquid crystals (PDLC). The PDLC panel includes liquid crystals dispersed within a polymer without using a polarizer film. When voltage is not applied to the optical shutter, the liquid crystals are non-uniformly arranged in the optical shutter, so that the optical shutter blocks light. When voltage is applied thereto, the liquid crystals are uniformly arranged, so that the optical shutter is switched to a transparent state. With this configuration, the optical shutter 46 blocks light from the front backlight unit 30 and the rear backlight unit 40 described below, thereby forcibly blocking display of the front display unit 10.

As shown in the drawings, the front backlight unit 30 includes optical sheets such as a prism sheet 32 and a diffusive sheet 34, a first light guide plate 36, first light sources 38, and a reflective sheet 39. The prism sheet 32 is an optical sheet for collecting light and the diffusive sheet 34 is an optical sheet for dispersing light in order to obtain uniform brightness. Such optical sheets may be selectively used or replaced by other optical sheets. Further, the front backlight unit may further include a protective sheet and the like. As shown in the drawings, such optical sheets are partially formed with image holes 18 through which the rear display unit 50 is visible.

The first light guide plate 36 receives light from the first light sources 38 through a thickness plane and emits light through a surface of the panel, and is formed of transparent acryl or the like. Each of the first light sources 38 may be embodied by a cold cathode fluorescent lamp (CCFL) as shown in FIG. 1, or may be embodied by an LED as shown in FIGS. 2 and 3. Further, the first light sources 38 are disposed at peripheral sides of the first light guide plate 36. In this embodiment, the first light sources 38 are illustrated as being disposed at upper and lower sides of the first light guide plate 36. Alternatively, the first light sources 38 may also be disposed at right and left sides of the first light guide plate 36.

As shown in the drawings, the first light guide plate 36 is formed with projection windows 16 through which the rear display unit 50 is visible. The projection windows 16 are non-luminous regions, and light of the front backlight unit 30 is not generated from regions having the projection windows 16. Accordingly, it is possible to view the rear display unit 50 through the projection windows 16 while a screen is displayed on the display panel 20.

Meanwhile, in the embodiment of FIG. 1, the projection windows 16 are formed by cutting three central regions of the first light guide plate 36 to form openings on the first light guide plate. However, in some embodiments, the projection windows 16 may be formed without cutting the central regions of the first light guide plate 36, and this technique will be described below with reference to FIGS. 4 and 5.

The reflective sheet 39 is disposed at the rear of the first light guide plate 36 to reflect light. As in the optical sheets described above, the reflective sheet 39 is opened at three regions corresponding to the projection windows 16 to form the image holes 18. The reflective sheet 39 may be realized by a protective glass which includes a reflective film attached to an overall surface thereof.

In order to allow the front display unit 10 to display an image on an entire screen thereof, the display apparatus according to the embodiments further includes a separate rear backlight unit 40 behind the front backlight unit 30. As shown in FIGS. 2 and 3, the display panel 20 and the front backlight unit 30 are placed inside a front backlight unit housing 12, and the rear backlight unit 40 is disposed within a separate rear backlight unit housing 14. Advantageously, the rear backlight unit housing 14 may be assembled to an opening formed on a backside of the front backlight unit housing 12.

The rear backlight unit 40 includes second light guide plates 42 placed corresponding to the projection windows 16 of the front backlight unit 30, and second light sources 44 disposed at peripheral sides of each of the second light guide plates 42. Like the first light guide plate 36, the second light guide plates 42 may be realized by transparent panels, and the second light sources 44 may be realized by CCFLs or LEDs.

Here, in order to achieve the objectives of the present invention, the rear backlight unit 40 is configured to illuminate the front display unit 10 and is viewable. Thus, the rear backlight unit 40 is not provided at the backside thereof with any reflective sheet. Instead, as shown in the drawings, the rear backlight unit 40 has a specified structure different from a typical backlight unit.

The second light guide plates 42 of the rear backlight unit 40 are bent in a V-shape. As shown in the drawings, an upper portion of each of the second light guide plates 42 constitutes a first light guide plane 42a which is slanted upwards towards the rear side of the display apparatus. A lower portion of each of the second light guide plates 42 constitutes a second light guide plane 42b which is slanted downwards towards the rear side of the display apparatus. The second light sources 44 are disposed at an upper portion of the first light guide plane 42*a* and a lower portion of the second light guide plane 42*b*, respectively. Although not shown in the drawings, each of the first and second light guide planes 42*a*, 42*b* is printed with a pattern for collecting and refracting light forwards when the light enters the light guide plate. For example, the pattern may be a pattern of dots arranged in a matrix.

In the rear backlight unit 40, the first and second light guide planes 42*a*, 42*b* form slanted surfaces, receive light of the second light sources 44 through front sides thereof, and refract the light in the front direction. Here, the first and second light guide planes 42*a*, 42*b* forming the slanted surfaces are not provided with reflective sheets, and do not refract light through rear sides thereof. When the rear backlight unit 40 is turned off, the second light guide plates 42 are switched to a transparent state, so that the rear display unit 50 behind the front display unit may be viewed through the second light guide plates 42 of the rear backlight unit 40.

For example, when the rear backlight unit 40 is turned off, the rear display unit 50 is viewable through the rear backlight unit 40, so that the display apparatus may display a combined image of the front and rear display units 10, 50. Further, when the rear backlight unit 40 is turned on, the rear display unit 50 is completely blocked from a user's view and the rear backlight unit 40 illuminates the projection windows 16 of the front backlight unit 30, so that a clear image may be displayed throughout the screen of the front display unit 10. Further, visibility of the rear display unit 50 may be adjusted by dimming control of the rear backlight unit 40.

Although not shown in the drawings, the display apparatus may further include an optical shutter on the front side of the rear backlight unit 40. The optical shutter on the front side of the rear backlight unit 40 is operated to completely shield light of the rear backlight unit 40.

Figure 4:
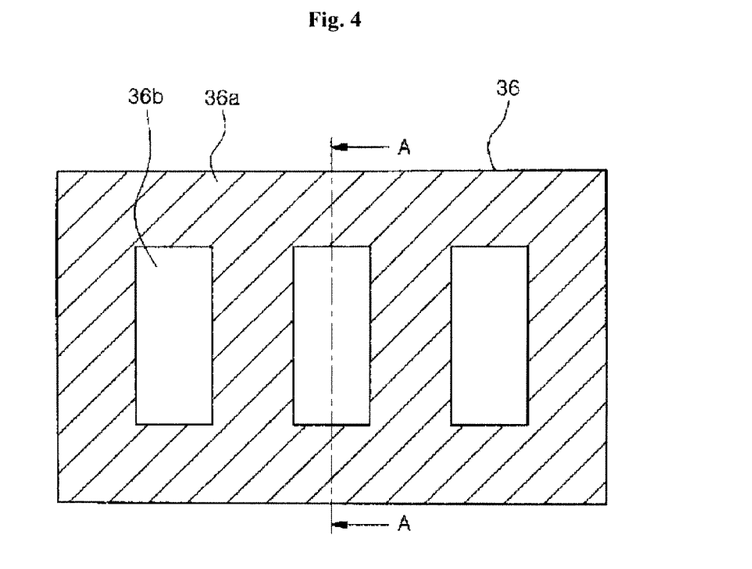
FIG. 4 is a front view of a first light guide plate in accordance with another embodiment of the present invention.
Figure 5:
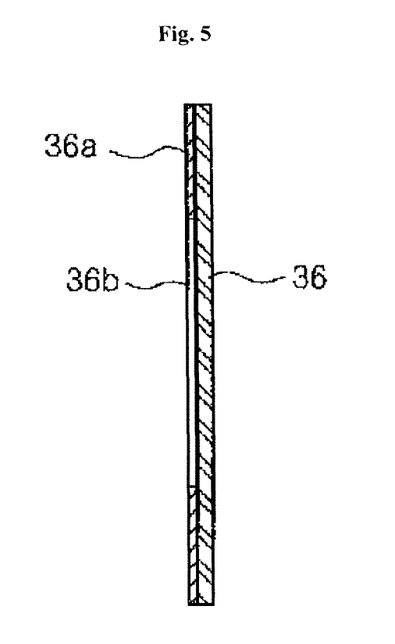
FIG. 5 is a cross-sectional view of the first light guide plate taken along line A-A' of FIG. 4.

FIG. 4 is a front view of a first light guide plate in accordance with another embodiment of the present invention, and FIG. 5 is a cross-sectional view of the first light guide plate taken along line A-A' of FIG. 4.

Referring to these drawings, in this embodiment, the first light guide plate 36 is formed with projection windows 16 without cutting the central regions thereof.

Referring to FIG. 4, the first light guide plate 36 has a pattern region 36*a* and a non-pattern region 36*b*. In the first light guide plate 36, a predetermined pattern is printed only on a region through which the rear display unit 50 is not viewed, that is, on a region on which the projection windows 16 will not be formed. The pattern formed on the pattern region 36*a* is typically the same as the pattern printed over the entire surface of the light guide plate, and serves to collect and refract light forwards when the light enters the light guide plate. For example, the pattern formed on the pattern region 36*a* may be a pattern of dots arranged in a matrix. Further, brightness of the light guide plate may be determined by adjusting distances between pattern rows and between pattern columns. In some embodiments, a combined pattern may be used to improve brightness and light uniformity of the light guide plate.

The non-pattern region 36*b* has no pattern and is formed on a region of the first light guide plate 36 corresponding to the projection windows 16 through which the rear display unit 50 is visible. The non-pattern region 36*b* prevents light from being emitted through the front side thereof by total reflection of the light incident on the first light guide plate 36. With this configuration, the first light guide plate 36 emits light only through the front side of the pattern region 36*a* without emitting light through the front side of the non-pattern region 36*b*.

Here, total reflection of light occurring within the non-pattern region 36*b* of the first light guide plate 36 cannot be observed from the outside, so that the non-pattern region 36*b* appears transparent.

In this configuration of the first light guide plate 36, since the central region of the light guide plate is not removed, the first light guide plate 36 may be manufactured by a simple process. Further, compared with the first light guide plate 36, the central regions of which are removed as shown in FIG. 1, the first light guide plate 36 according to this embodiment provides an increased total reflection area, thereby improving brightness. This effect may reduce overall power consumption of the display apparatus through a reduction in power consumption of the first light source 38. Further, a light shielding effect occurs between the pattern region 36*a* and the non-pattern region 36*b*, thereby significantly suppressing light interference between the front backlight unit 30 and the rear backlight unit 40.

Although some embodiments have been described herein, it should be understood by those skilled in the art that these embodiments are given by way of illustration only, and that various modifications, variations and alterations can be made without departing from the spirit and scope of the invention. Therefore, the scope of the invention should be limited only by the following claims and equivalents thereof.

The invention claimed is:

1. A display apparatus including a front display unit (10) and a rear display unit (50) disposed behind the front display unit (10) such that an image of the rear display unit (50) can be viewed through part of the front display unit (10), the front display unit (10) comprising:
    a display panel (20);
    a front backlight unit (30) including a first light guide plate (36) disposed behind the display panel (20) and having a projection window (16) through which the rear display unit (50) is visible, a first light source (38) arranged along the circumference of the first light guide plate (36), and a reflective sheet (39) placed on a backside of the first light guide plate (36) to reflect light and opened at a region thereof corresponding to the projection window (16) to form an image hole (18); and
    a rear backlight unit (40) including a second light guide plate (42) disposed at a place corresponding to the projection window (16) behind the front backlight unit (30) and bent in a V-shape, the second light guide plate (42) including a first light guide plane (42*a*) slanted upwards towards a rear side of the display apparatus and a second light guide plane (42*b*) slanted downwards from a lower end of the first light guide plane (42*a*) towards the rear side of the display apparatus, and second light sources (44) disposed at upper and lower ends of the second light guide plate (42) to illuminate the first and second light guide planes (42*a*, 42*b*), respectively.

2. The display apparatus of claim 1, wherein the rear display unit (50) is a rotational reel display unit having a plurality of variable image arrays.

3. The display apparatus of claim 2, further comprising: a rear display lighting unit (56) which illuminates the rear display unit (50).

4. The display apparatus of claim 1, wherein the rear display unit (50) comprises one of an LCD, PDP, OLED, and. AMOLED.

5. The display apparatus of claim wherein the rear display unit (50) is a picture or an object which displays an image.

6. The display apparatus of claim 5, further comprising:
    a rear display lighting unit (56) which illuminates the rear display unit (50).

7. The display apparatus of claim 1, wherein the display panel (20) is a liquid crystal panel which comprises a TFT substrate (26), a color filter (24), and liquid crystals encapsulated between the TFT substrate (26) and the color filter (24) bonded to each other.

8. The display apparatus of claim 1, wherein the projection window (16) is formed by cutting a part of the first light guide plate (36) corresponding to the rear display unit (50).

9. The display apparatus of claim 1, wherein the first light guide plate (36) comprises a pattern region (36*a*) formed on a region thereof excluding the projection window (16) and having a pattern printed thereon, and a non-pattern region (36*b*) formed on a region of the projection window (16) and having no pattern.

10. The display apparatus of claim 1, further comprising: an optical shutter (46) disposed behind the display panel (20).

11. The display apparatus of claim 10, wherein the optical shutter (46) is a liquid crystal shutter comprising polymer dispersed liquid crystals (PDLC).

12. The display apparatus of claim 1, wherein the first and second light sources are CCFLs or LEDs.

\* \* \* \* \*